United States Patent
Seo et al.

(10) Patent No.: US 9,224,423 B1
(45) Date of Patent: Dec. 29, 2015

(54) RE-WRITING OF INITIAL SECTORS IN A STORAGE DEVICE

(71) Applicant: Seagate Technology LLC, Cupertino, CA (US)

(72) Inventors: You Hwan Seo, Suwon-si (KR); Sang Hyub Lee, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/502,691

(22) Filed: Sep. 30, 2014

(51) Int. Cl.
*G11B 5/09* (2006.01)
*G11B 20/12* (2006.01)

(52) U.S. Cl.
CPC .... *G11B 20/1217* (2013.01); *G11B 2020/1232* (2013.01); *G11B 2020/1298* (2013.01)

(58) Field of Classification Search
None
See application file for complete search history.

(56) References Cited

U.S. PATENT DOCUMENTS

| | | | |
|---|---|---|---|
| 6,975,468 B1 * | 12/2005 | Melrose et al. | 360/31 |
| 6,999,256 B2 | 2/2006 | Kim et al. | |
| 7,218,467 B2 | 5/2007 | Kim et al. | |
| 7,379,256 B2 * | 5/2008 | McMurtrey | 360/53 |
| 7,502,283 B2 | 3/2009 | Schmidt et al. | |
| 7,518,819 B1 * | 4/2009 | Yu et al. | 360/75 |
| 2002/0030915 A1 * | 3/2002 | Nishida et al. | 360/60 |
| 2005/0141129 A1 * | 6/2005 | Schmidt et al. | 360/77.08 |
| 2013/0170061 A1 * | 7/2013 | Saito et al. | 360/39 |

* cited by examiner

*Primary Examiner* — Tan X Dinh
(74) *Attorney, Agent, or Firm* — Taylor English Duma LLP

(57) ABSTRACT

Technologies are described herein for rewriting the initial sectors of a data track on a recording medium of a storage device in order to reduce the occurrence of initial sector weak writes and/or adjacent track erasure. Upon receiving a write command at the storage device, a plurality of sequential segments on the recording media targeted by the write command is determined. The plurality of sequential segments is written to the recording medium, and then data is rewritten to an initial segment of the plurality of sequential segments.

20 Claims, 5 Drawing Sheets

RE-WRITING OF INITIAL SECTORS IN A STORAGE DEVICE

BRIEF SUMMARY

The present disclosure relates to technologies for rewriting the initial sectors of a data track on recording media of a storage device, such as a hard-disk drive ("HDD") device, in order to reduce the occurrence of initial sector weak writes and/or adjacent track erasure. According to some embodiments, a method for rewriting the initial sectors of a data track on a recording media comprises receiving a write command at the storage device and determining a plurality of sequential segments on the recording media targeted by the write command. The plurality of sequential segments is written to the recording media, and then data is rewritten an initial segment of the plurality of sequential segments.

According to further embodiments, a computer-readable medium has processor-executable instructions stored thereon that cause a processor to, upon receiving a write command for a storage device, determine a sequence of sectors on a recording media of the storage device targeted by the write command. The processor writes data to the sequence of sectors, and then rewrites data to one or more consecutive sectors from the sequence of sectors.

According to further embodiments, a system comprises a hard disk drive having a recording medium, a processor operably connected to the hard disk drive, and a hard disk drive comprising a recording medium, and a writing module operably connected to the hard disk drive and the processor. The writing module is configured to determine a sequence of sectors on a data track of the recording medium targeted by a write command and add blocks to a write cache for writing the sequence of sectors. Additional blocks are then inserted into the write cache for rewriting data to one or more consecutive sectors from the sequence of sectors. A preheating function of the hard disk drive is disabled, and the write cache is flushed to effect writing of the data to the recording medium, including the rewrite of the sequence of sectors.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
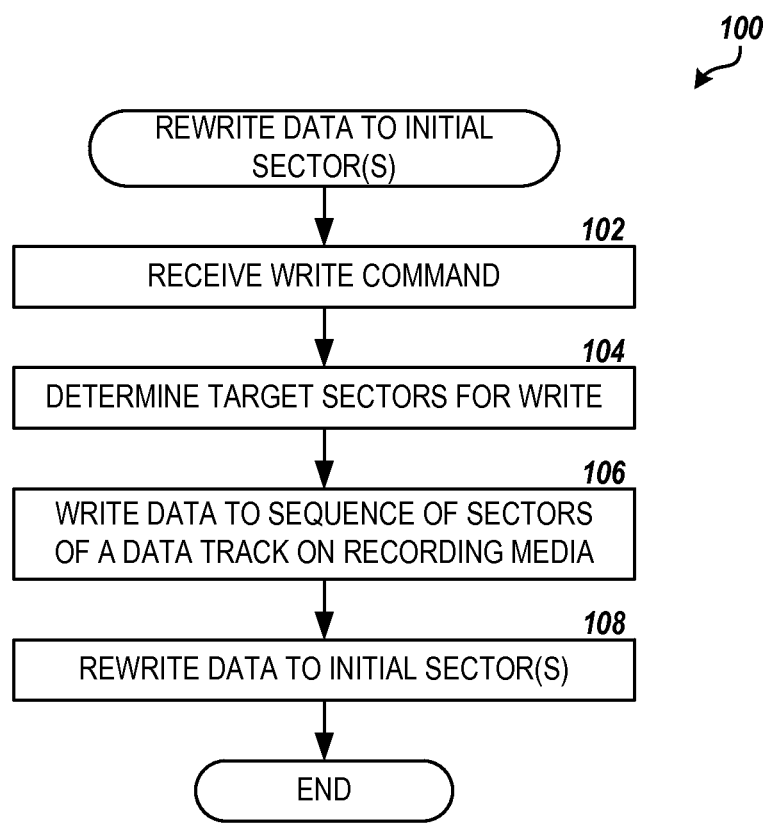
FIG. 1 is a flow diagram showing one method for rewriting the initial sectors of a data track on the recording media of a storage device, according to embodiments described herein.

The following detailed description is directed to technologies for rewriting the initial sectors of a data track on the recording media of a storage device in order to reduce the occurrence of initial sector weak writes and/or adjacent track erasure. A typical storage device may include a hard-disk drive ("HDD") device. The HDD device may contain a number of disks having a magnetic recording surface upon which data is stored. The recording surface(s) may be formatted to include a number of concentric data tracks, the data tracks further divided into sectors that contain the data stored on the device. The storage device writes data to the recording surface(s) via one or more read/write heads, which are positioned over the target data tracks for the data while the rotation of the disk brings the target sector(s) under the head. Movement of the read/write heads from track to track is referred to herein as a "seek operation."

Generally, during a long seek operation, where the read/write head searches for a target data track for a write operation, no write-current is supplied to the head and the head heater used to control the protrusion of the writing elements of the head towards the recording surface is off. Once the target data track is located, the head heater is turned on and write-current is supplied to the writing element(s) to perform the write. However, once the write current is applied and the head heater is turned on, a certain amount of time may be needed for the head to properly heat up and protrude. Sectors written before proper head protrusion is accomplished may have insufficient signal applied to allow for a successful write, referred to herein as the "initial sector weak write" problem.

To compensate for this problem, the controllers in some conventional HDD devices may turn on the head heater for a period of time prior to the write operation in order to allow for proper head protrusion. This is referred to as "preheating." Due to variations in the qualities and operation of the writing elements and head heaters amongst the read/write heads in a device, the amount and speed of head protrusion may vary from head to head, making precise control of head protrusion by preheating difficult to achieve. Too little preheating of the head may result in insufficient protrusion, causing weak writes and data loss, while too much preheating may result in excessive protrusion causing erasure of data in adjacent tracks during the write, especially in the case of shingled magnetic recording ("SMR") where partially overlapping data tracks are written.

According to embodiments presented herein, a novel writing method to solve the initial sector weak write problem includes rewriting the initial sector(s) of a first data track targeted by a write operation after the last sectors on the track have been written and before the next track is written. Rewriting the initial sectors may prevent weak writes to the first sectors on the target track without resorting to the use of preheating, thus reducing the chances of adjacent track erasure ("ATE"). This approach may be especially effective for a storage device that employs SMR, where sequential write operations are performed for bands of multiple overlapping data tracks as a single unit.

FIG. 1 shows aspects of the improved writing method according to the embodiments described herein. Specifically, FIG. 1 illustrates one routine 100 for rewriting the initial sectors of a data track on the recording media of a storage device. According to some embodiments, the routine 100 may be performed by a controller of the storage device during normal operation, or "user mode," of the device. The routine 100 includes step 102, where a write command is received at the storage device. In some embodiments, the write command may be a sequential write operation involving multiple sequential sectors and/or multiple adjacent data tracks on the recording media of the storage device. From step 102, the routine 100 proceeds to step 104, where the sequential sectors on the recording media targeted by the write operation are determined. For example, the write command may involve all sectors of multiple, overlapping tracks in a single band on the recording surface(s) configured for SMR.

The routine 100 proceeds from step 104 to step 106, where data is written to the sequence of sectors on a first data track. In the previous example, this may include writing sectors 1 through N (at N sectors per track) on the first data track of the SMR band. In some embodiments, the write is performed with the preheat function of the storage device disabled in order to avoid ATE during the write. Next, the routine 100 proceeds to step 108, where the data is written again to the initial sectors from the sequence of sectors. For example, sectors 1 through K of the first data track may be written again in order to reduce the possibility of an initial first sector weak write issue in these sectors. The number K of sectors to be rewritten may depend on the time required for appropriate protrusion of the head to be accomplished when the head heater is turned and write current is applied to the read/write head. The number K sectors may be different from head to head within a single storage device, and may be determined through experimentation for the storage device or class of devices, as will be described in more detail below. From step 108, the routine 100 ends.

Figure 2:
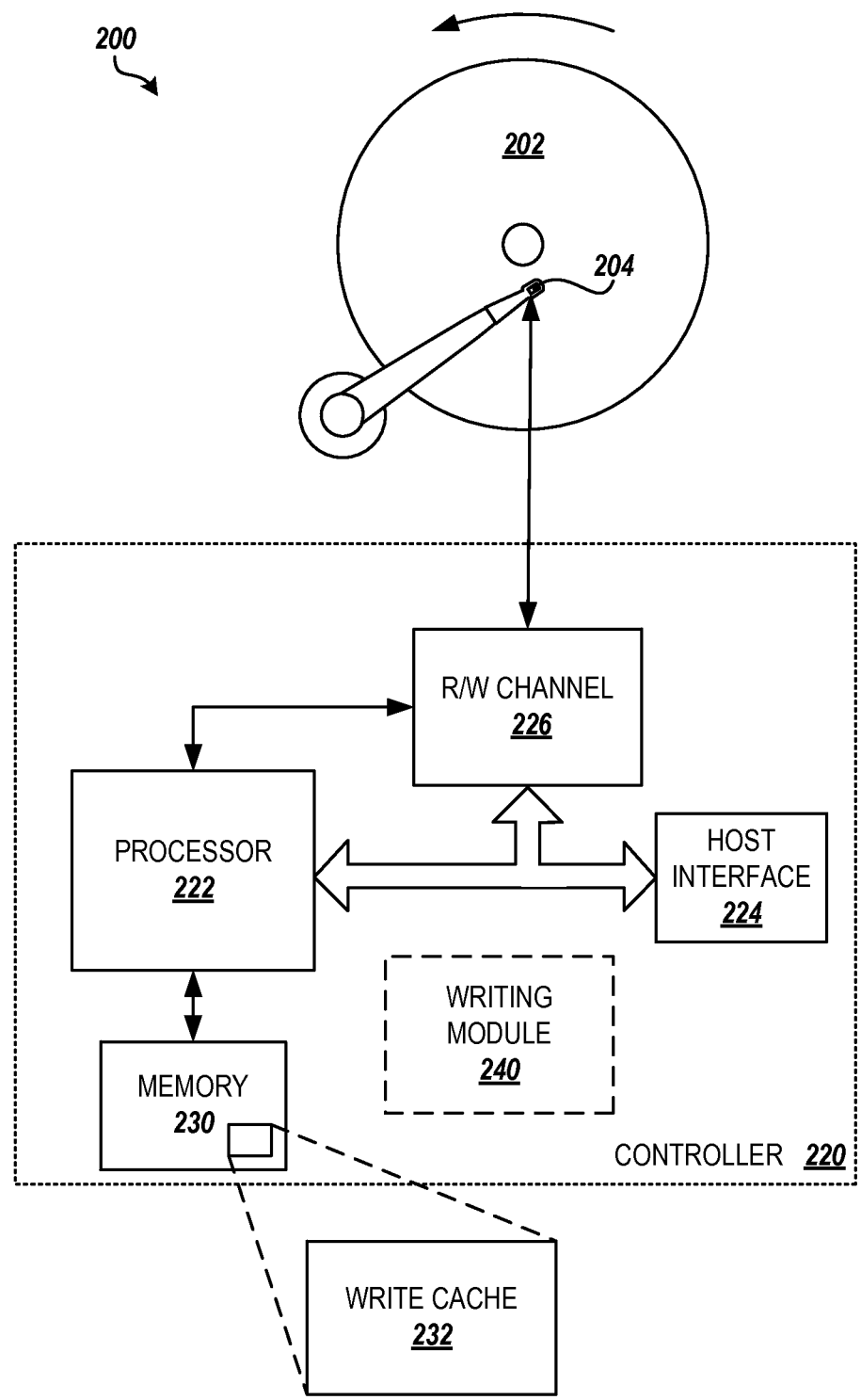
FIG. 2 is a block diagram showing an illustrative environment for rewriting the initial sectors of a data track on the recording media of a storage device in order to reduce the occurrence of initial sector weak writes and/or adjacent track erasure, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for rewriting the initial sectors of a data track on the recording media of the storage device, according to the embodiments provided herein. The storage device 200 may include recording media comprising at least one platter or disk 202.

The storage device 200 further includes at least one read/write head 204 located adjacent to the surface of each disk 202. The read/write head 204 may read information from the disk 202 by sensing a magnetic field formed on portions of the magnetic recording surface of the disk, and may write information to the disk by magnetizing a portion of the surface of the disk. It will be appreciated by one of ordinary skill in the art that the read/write head 204 may comprise multiple components, such as a magneto-resistive ("MR") or tunneling MR reader element, an inductive writer element, a fly-on-demand ("FOD") head heater, a slider, and the like.

Figure 3A:
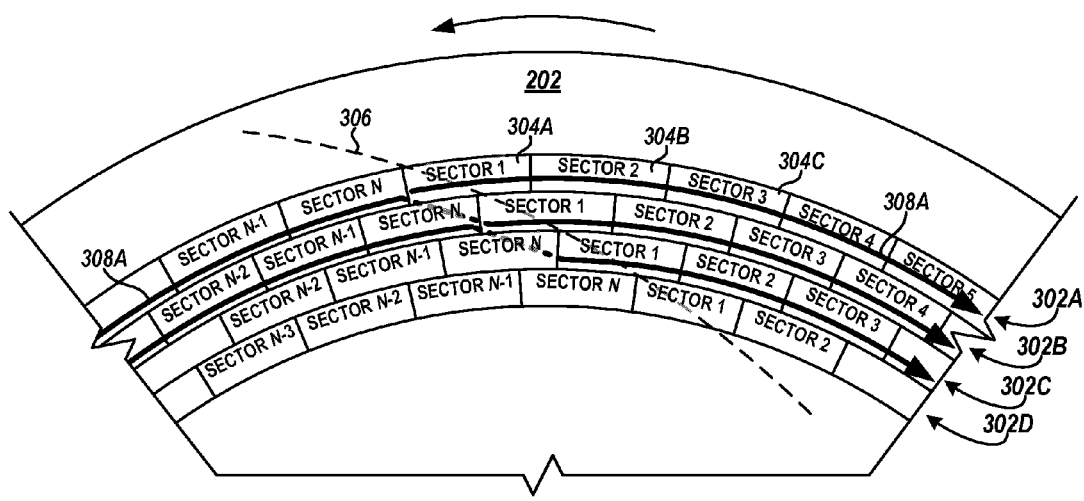
FIGS. 3A and 3B are block diagrams showing an illustrative layout of data tracks and sectors on disk media as well as details regarding methods described herein for rewriting the initial sectors of a data track to reduce the occurrence of initial sector weak writes and/or adjacent track erasure.

According to some embodiments, the recording surface of the disk 202 is divided or "formatted" into a number of individual data tracks, such as data tracks 302A-302D (referred to herein generally as data tracks 302) shown in FIG. 3A. The data tracks 302 may represent substantially concentric circular areas on the surface of the disk 202. Each data track 302A-302D is further divided or formatted into a number N of data sectors, such as sectors 304A-304C (referred to herein generally as sectors 304). The sectors 304 may represent independent areas of the data track 302 in which user data is stored and maybe numbered sequentially from sector 1 to sector N. It will be appreciated that the number N of sectors 304 per data track 302 may vary from zone to zone and that sector 1 304A of two adjacent data tracks, such as data track 302A and data track 302B, within a zone may not be aligned but instead may be offset by a specific distance, as indicated at 306, to allow time for the read/write head 204 to move from a previous data track 302A to a next data track 302B when seeking from the last sector of the previous track to the first sector of the next. This offset distance is referred to as the cylinder skew 306.

Returning to FIG. 2, the storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a specific sector 304 on the on the surface of the disk 202 by moving the read/write head 204 radially across the data tracks 302 using the actuator while a motor rotates the disk to bring the target sector under the read/write head.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the memory 230 may store processor-executable instructions that, when executed by the processor 222, perform the routines 100 and 500 for rewriting the initial sectors 304 of a data track 302 on the recording media of the storage device 200, as described herein.

In some embodiments, the memory 230 may include a write cache 232. The processor 222 may temporarily store blocks of data to be written to the recording media received from the host in the write cache 232 until the data contained therein may be written to disk. The write cache 232 may be implemented in DRAM of the controller, for example. The write cache 232 may be of a fixed size, according to some embodiments. For example, the write cache may be 32 MB or 64 MB in size. The write cache 232 may be configured to store blocks of data based on target sector 304 or groups of sectors, also referred to herein as "segments." A segment may comprise one or more consecutive sectors 304. In this way, the processor 222 may re-order individual sector or segment writes in order for the writes to be processed more efficiently by the recording channel. In further embodiments, the write cache 232 may be stored in a computing system external to and operably connected to the storage device 200, such as a cluster controller connected to a number of "dumb" disk drives or in a driver module of a host device connected to storage device through the interface 224, for example.

In addition to the memory 230, the environment may include other computer-readable media storing program modules, data structures, and other data described herein for rewriting the initial sectors 304 of a data track 302 on the recording media of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a writing module 240. The writing module 240 may be executed when a write command is received from a connected host and may determine the target locations of the recording media, e.g. the sectors 304 and data tracks 302 on the recording surface of the disk 202, to which the data is to be written. The writing module 240 may then effect the write of the data to the target locations through the read/write channel 226. According to some embodiments, the writing module 240 may be implemented in the controller 220 as software, hardware, or any combination of the two. For example, the writing module 240 may be stored in the memory 230 as part of the firmware of the storage device 200 and may be executed by the processor 222 for performing the methods and processes described herein. The writing module 240 may alternatively or additionally be stored in other computer-readable media accessible by the controller 220. In further embodiments, the writing module 240 may be implemented in a computing system external to and operably connected to the storage device 200, such as in a driver module of a host device connected to storage device through the interface 224, for example. The writing module 240 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3B:
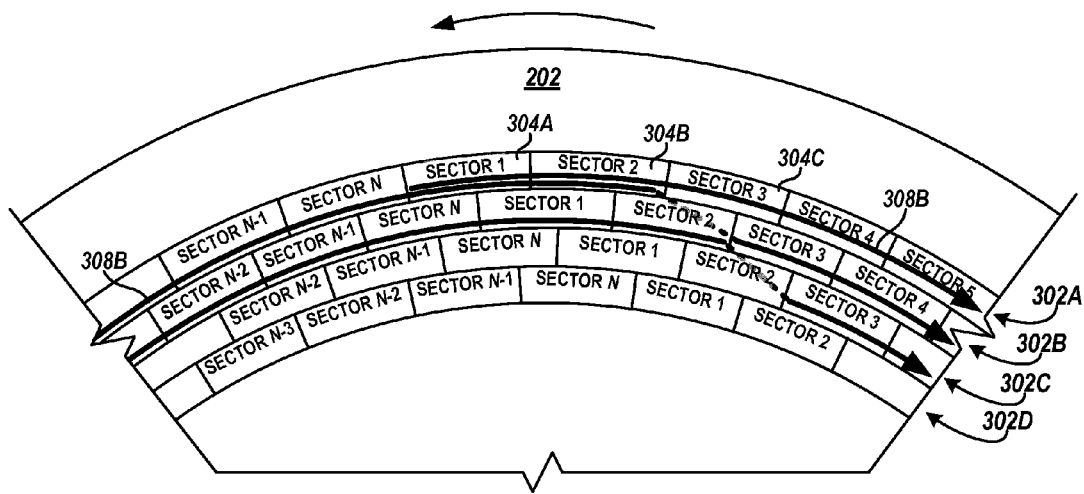

FIGS. 3A and 3B provide additional details of the methods described herein for rewriting the initial sectors of a data track on the recording media of a storage device in order to reduce the occurrence of initial sector weak writes and/or adjacent track erasure. A typical sequential write command may target all N sectors of multiple, adjacent tracks on the recording surface(s) of the storage device. This may be particularly the case in SMR, where an entire band, i.e., multiple, partially-overlapping data tracks, is written at once. As shown by line 308A in FIG. 3A, a conventional writing technique may involve writing sectors 1 through N on the first data track 302A of the target tracks, then moving the read/write head 204 to the next data track 302B (seek) and writing sectors 1 through N on the second track, and so on. With this conventional technique, however, the initial sectors of the first data track 302A, such as sectors 1 304A and sector 2 304B, may be susceptible to initial sector weak write, due to the head protrusion being inadequate when the writing is begun. Additionally, when using the preheating function described above, data may be erased in tracks adjacent to the first data track 302A by a strong writing signal during the write of the initial sectors 304A, 304B from an over-protruded head due to excessive preheating.

FIG. 3B shows details of the writing methods described herein, according to some embodiments. In some embodiments, after writing sectors 1 through N of the first data track 302A, a number of consecutive, initial sectors where there is a high chance of weak write errors, such as sector 1 304A and sector 2 304B, may be written a second time before beginning the write of the next data track 302B, as shown by line 308B. Because there should be correct head protrusion as the head completes the writing of the first data track 302A, there is less of a chance of weak writes occurring in these doubly-written sectors 304A, 304B than with the conventional technique described above in regard to FIG. 3A. Further, since the initial sectors 304A, 304B are rewritten after the last sector N of the first data track 302 targeted by the sequential write, the write operation may be performed with the preheating function of the storage device 200 disabled, thus avoiding ATE during the write of the initial sectors. According to some embodiments, double-writing the initial sectors 304A, 304B may only be performed for the first data track 302A in the sequential write operation, as further shown by line 308B.

While FIG. 3B shows the first two sectors 304A and 304B of the first data track 302A being rewritten, any number K of initial sectors or segments may be rewritten before moving to the next data track 302B, according to further embodiments. In further embodiments, a number K of consecutive last sectors 304, such as sectors N−2, N−1, and N of the first data track 302A targeted by the write command may be written first, followed by sectors 1 through N. Thus sectors N−2, N−1, and N may be written twice, and the read/write head 204 may then be positioned (seeked) to sector 1 of the next data track 302B to continue the write operation.

The number K of initial sectors 304 or last sectors to be rewritten may be determined by simulations of the recording channel during design of the storage device 200 or class of storage devices, for example. Alternatively or additionally, the number K of initial sectors 304 of last sectors to be rewritten may be established by tests performed during certification ("CERT") processing of a particular storage device 200 to determine the number of sectors susceptible to weak writes when the preheating function of the device is disabled. In further embodiments, the number of initial sectors 304 or segments to be rewritten may vary from read/write head 204 to read/write head within a storage device 200, e.g., $K_{H1}$, $K_{H2}$, $K_{H3}$, etc.

In some embodiments, only one initial sector 304A (K=1) may be rewritten. According to other embodiments, the initial segment or segments of the first data track 302A to be rewritten may comprise a portion of a sector 304. The number K of initial sectors 304 or segments to be rewritten may be stored in the memory 230 of the storage device 200. Further, the novel writing technique described herein may be utilized not only with the initial sector(s) of the first data track, but in any situation in the storage device 200 where weak write/ATE errors may occur.

Figure 4A:
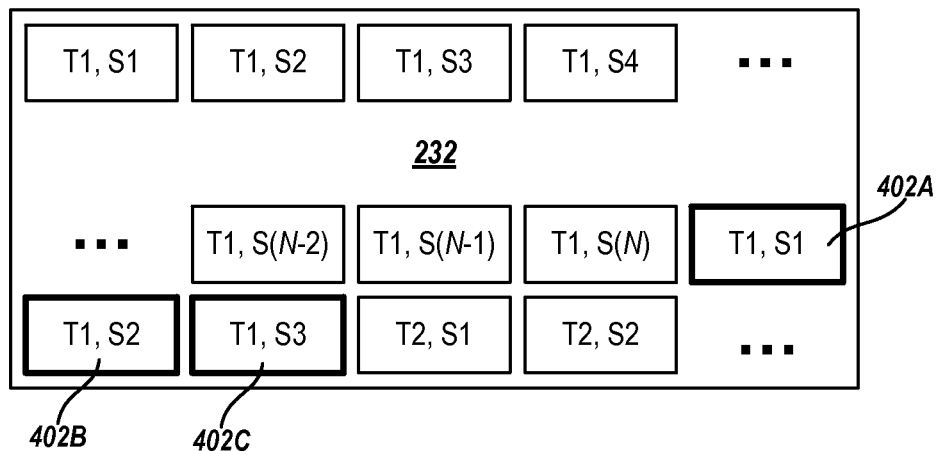
FIGS. 4A and 4B are block diagrams showing an illustrative use of a write cache to effect rewriting of initial sectors of a data track on the recording media, according to embodiments described herein.
Figure 4B:
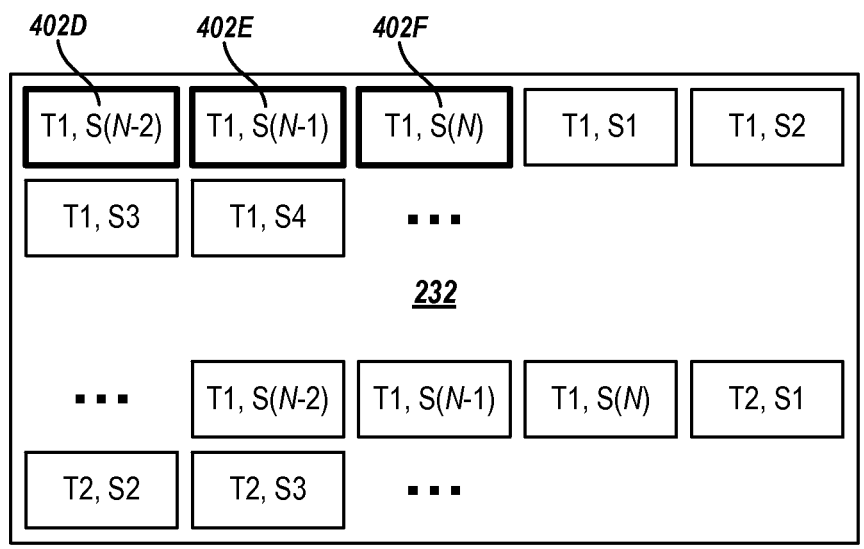

According to some embodiments described herein, one way to effect the novel writing method described herein is to add additional blocks to the write cache 232 for rewriting of the K initial sectors or segments before writing of the data to the recording media takes place. FIGS. 4A and 4B show additional details of this technique. When performing a band write in SMR, the data to be written to the data tracks 302 in the band are lined up in the write cache 232 in sector-order and a sequential write operation for the band is then performed. Thus, as shown in FIG. 4A, rewriting of the initial (K=3) sectors 304A-304C (indicated as S1, S2, and S3 in the figure) of the first data track 302A (T1) may be effected by adding additional blocks 402A-402C (referred to herein generally as blocks 402) to the write cache 232 after the block for the last sector (S(N)) of the first data track (T1) and before the block for the first sector (S1) of the second data track (T2) in the band. According to some embodiments, the additional blocks 402A-402C may be added by the writing module 240 for the storage device 200 when performing the sequential write operation.

Similarly, as shown in FIG. 4B, the technique described above of first writing the last (K=3) sectors 304, such as sectors N−2, N−1, and N, of the first data track 302A targeted by a sequential write, followed by sectors 1 through N of the track may be effected by adding additional blocks 402D-402F to the write cache 232 before the block for the first sector (S1) of the first data track (T1). The approach has the added advantage that no additional rotation of the disk 202 is necessary for the read/write head 204 to be positioned (seeked) after the second write of the last sector (S(N)) of the first data track (T1) to the first sector (S1) of the next track (T2). It will be appreciated that any number of addition blocks 402 may be added to the write cache 232 in any number of positions to effect the rewriting of initial sectors 304 as described herein.

Figure 5:
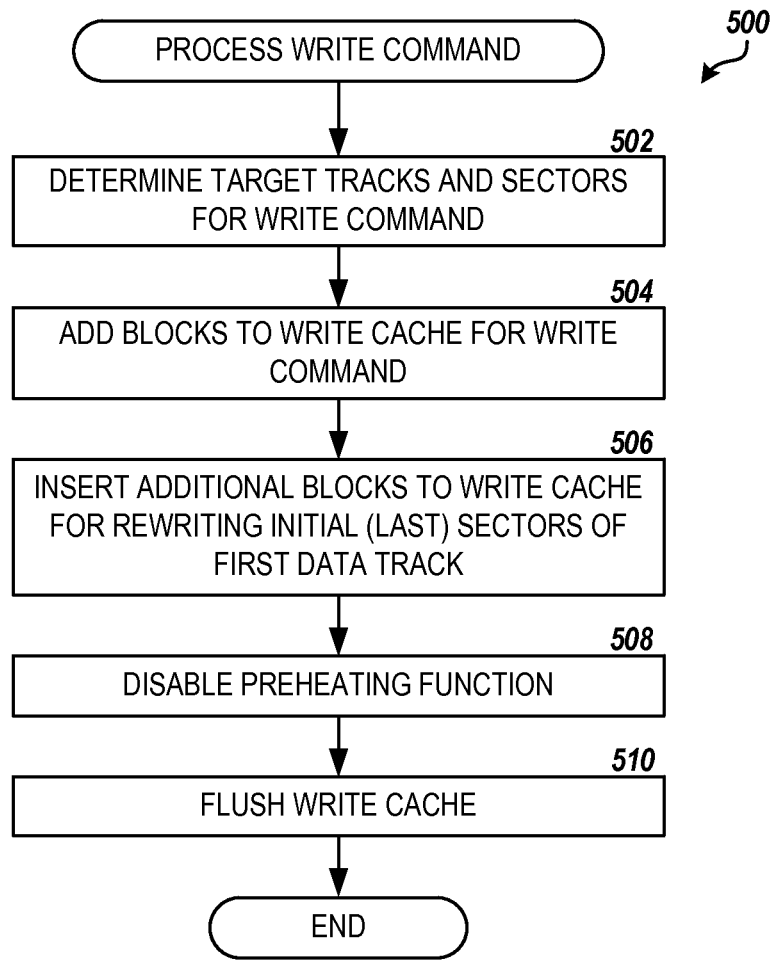
FIG. 5 is a flow diagram showing another routine for rewriting the initial sectors of a data track on the recording media of a storage device using the write cache, according to embodiments described herein.

FIG. 5 illustrates one routine 500 for rewriting the initial sectors of a data track on a recording medium using the technique described above in regard to FIGS. 4A and 4B, according to embodiments. According to some embodiments, the routine 500 may be performed by the writing module 240 during processing of a write command received at the host interface 224 of the storage device 200 while the device is operating in user mode. The write command may be a sequential write operation involving multiple, sequential sectors 304 and/or multiple adjacent data tracks 302 on the recording media of the storage device 200, for example. In further embodiments, the routine 500 may be performed by the controller 220 of the storage device 200, by external processors or computing systems accessing data from the device or some other combination of modules, processors and devices.

The routine 500 begins at step 502, where the writing module 240 determines the adjacent data tracks 302 and sequential sectors 304 targeted by the write command. Next, as step 504, the writing module 240 adds the appropriate blocks 402 to the write cache 232 for the sectors 304 and data tracks 302 determined in step 502. The routine 500 proceeds from step 504 to step 506, where the writing module 240 inserts additional blocks 402 into the write cache 232 at the appropriate position to effect the rewriting of the initial sectors 304 or segments of the first data track 302 during the write. For example, as described above in regard to FIG. 4A, the writing module 240 may add three additional blocks 402A-402C to the write cache 232 after the block for the last sector (S(N)) of the first data track (T1) and before the block for the first sector (S1) of the second data track (T2) to cause the initial (K=3) sectors S1, S2, and S3 of the first data track (T1) to be rewritten during the write operation.

Alternatively, the writing module 240 may add three additional blocks 402D-402F to the write cache 232 before the block for the first sector (S1) of the first data track (T1) to cause the last (K=3) sectors S(N−2), S(N−1), and S(N) of the first data track (T1) to be written twice during the write operation, as described above in regard to FIG. 4B. Other blocks 402 may be added to the write cache 232 by the writing module 240 to cause other sectors 304 or segments to be rewritten as required by the novel writing method described herein.

The routine 500 proceeds from step 506 to 508, where the preheating function of the storage device 200 is disabled before processing the write. This may allow ATE to be avoided during the writing of the initial sectors 304 of the first data track 302A due to excessive or imprecise preheating of the read/write head 204. From step 508, the routine 500 proceeds to step 510, where the write cache 232 is flushed to the recording media, thereby performing the write operation including the rewriting of the initial or last K sectors 304 of the first data track 302A, according to the embodiments described herein. From step 510, the routine 500 ends.

Based on the foregoing, it will be appreciated that technologies for rewriting the initial sectors of a data track on a recording medium of a storage device in order to reduce the occurrence of initial sector weak writes and/or adjacent track erasure are presented herein. While embodiments are described herein in regard to an HDD device, it will be appreciated that the embodiments described in this disclosure may be utilized in any storage device wherein weak writes and/or ATE may occur due to inadequate preheating or preconditioning of a read/write head, including but not limited to, a magnetic disk drive, a hybrid magnetic and solid state drive, an optical disk storage device, and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   receiving a write command at a controller of a storage device;
   determining, by the controller, a plurality of sequential segments of a recording media targeted by the write command;
   writing, by the controller, data to each of the plurality of sequential segments; and
   upon writing data to a last segment of the plurality of sequential segments, rewriting, by the controller, the data to an initially-written segment of the plurality of sequential segments.

2. The method of claim 1, wherein the initially-written segment comprises a first sector of a data track on the recording media.

3. The method of claim 1, wherein the initially-written segment comprises a last sector of a data track on the recording media.

4. The method of claim 1, further comprising disabling a head preheating function for the storage device.

5. The method of claim 1, wherein the write command targets a plurality of data tracks on the recording media, and wherein rewriting data to the initially-written segment is performed only for a first data track of the plurality of data tracks.

6. The method of claim 5, wherein the plurality of data tracks comprises multiple, overlapping data tracks configured for shingled magnetic recording.

7. The method of claim 1, wherein rewriting the data to the initially-written segment is effected by inserting additional blocks to a write cache of the storage device.

8. The method of claim 1, wherein the recording media comprises a magnetic surface of a disk in an HDD device.

9. A non-transitory computer-readable medium having processor-executable instructions stored thereon that, when executed by a processor, cause the processor to:
   receive a write command for a storage device;
   determine a data track on a recording media of the storage device targeted by the write command, the data track comprising a sequence of sectors;
   write data to each of the sequence of sectors of the data track; and
   upon writing data to a last sector of the sequence of sectors, rewrite the data to one or more previously written sectors from the sequence of sectors.

10. The computer-readable medium of claim 9, wherein the one or more previously written sectors comprises a first sector of the data track.

11. The computer-readable medium of claim 9, wherein the one or more previously written sectors comprises a last sector of the data track.

12. The computer-readable medium of claim 9, having further processor-executable instructions stored thereon that cause the processor to disable a head preheating function for the storage device.

13. The computer-readable medium of claim 9, wherein the write command targets a plurality of data tracks on the recording media, and wherein rewriting data to the one or more previously written sectors is performed only for a first data track of the plurality of data tracks.

14. The computer-readable medium of claim 13, wherein the plurality of data tracks comprises multiple, overlapping data tracks configured for shingled magnetic recording.

15. The computer-readable medium of claim 9, wherein rewriting data to the one or more previously written sectors is effected by inserting additional blocks to a write cache of the storage device.

16. A system comprising:
   a hard disk drive comprising a recording medium;
   a processor operably connected to the hard disk drive; and
   a writing module operably connected to the hard disk drive and the processor and configured to perform steps of
   determine a sequence of sectors on a data track of the recording medium targeted by a write command,
   add blocks to a write cache for writing the sequence of sectors,
   insert additional blocks in the write cache for rewriting data to one or more consecutive sectors from the sequence of sectors,
   disabling a preheating function of the hard disk drive, and
   flushing the write cache.

17. The system of claim 16, wherein the one or more consecutive sectors comprises a first sector of the data track.

18. The system of claim 17, wherein the additional blocks are inserted in the write cache after a last sector of the data track and before a first sector of a next data track targeted by the write command.

19. The system of claim 16, wherein the one or more consecutive sectors comprises a last sector of the data track on the recording medium.

20. The system of claim 19, wherein the additional blocks are inserted in the write cache before a first sector of the data track.

* * * * *